United States Patent
Takenaka

(10) Patent No.: US 9,457,763 B2
(45) Date of Patent: Oct. 4, 2016

(54) COLLISION DETECTION APPARATUS

(71) Applicant: TOYOTA JIDOSHA KABUSHIKI KAISHA, Toyota-shi, Aichi (JP)

(72) Inventor: Kenichi Takenaka, Chiryu (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/595,366

(22) Filed: Jan. 13, 2015

(65) Prior Publication Data

US 2015/0224956 A1    Aug. 13, 2015

(30) Foreign Application Priority Data

Feb. 7, 2014   (JP) .................................. 2014-022842

(51) Int. Cl.
| | |
|---|---|
| *G01L 1/00* | (2006.01) |
| *B60R 21/36* | (2011.01) |
| *B60R 21/0134* | (2006.01) |
| *B60R 21/0136* | (2006.01) |
| *B60R 21/38* | (2011.01) |
| *G01L 5/00* | (2006.01) |

(52) U.S. Cl.
CPC ........... *B60R 21/36* (2013.01); *B60R 21/0134* (2013.01); *B60R 21/0136* (2013.01); *B60R 21/38* (2013.01); *G01L 5/0052* (2013.01)

(58) Field of Classification Search
CPC ............ B60R 1/0134; B60R 21/0136; B60R 5/0052; B60R 21/36; B60R 21/38
USPC ..................... 73/862.381, 12.09, 12.04, 12, 9
See application file for complete search history.

(56) References Cited

U.S. PATENT DOCUMENTS

| | | | | |
|---|---|---|---|---|
| 4,249,632 | A * | 2/1981 | Lucchini ................. | B60R 21/38 180/274 |
| 7,102,496 | B1 * | 9/2006 | Ernst, Jr. ................. | G08G 1/164 180/167 |
| 7,803,054 | B1 * | 9/2010 | Ogus ........................ | A63F 13/12 463/31 |
| 2006/0213714 | A1 * | 9/2006 | Igawa ................. | B60R 21/0134 180/274 |
| 2014/0207341 | A1 * | 7/2014 | Wanami .............. | B60R 21/0134 701/46 |

FOREIGN PATENT DOCUMENTS

| | | |
|---|---|---|
| JP | 11-105666 A | 4/1999 |
| JP | 2003-226211 A | 8/2003 |
| JP | 2003-291758 A | 10/2003 |
| JP | 2004-78393 A | 3/2004 |
| JP | 2005-041334 A | 2/2005 |

* cited by examiner

*Primary Examiner* — Max Noori
(74) *Attorney, Agent, or Firm* — Sughrue Mion, PLLC

(57) ABSTRACT

A collision detection apparatus includes: an impact force detector configured to detect an impact force generated on a vehicle; a collision detector configured to detect collision with an obstacle outside of the vehicle at the time the impact force detector detects the impact force exceeding a threshold value; a collision predictor configured to predict that a bicycle being operated by a bicycle rider will collide with the vehicle before the collision with the obstacle outside of the vehicle is detected by the collision detector; and a colliding direction predictor configured to predict that the collision of the bicycle with the vehicle predicted collision with a front surface or a rear surface of the bicycle.

4 Claims, 4 Drawing Sheets

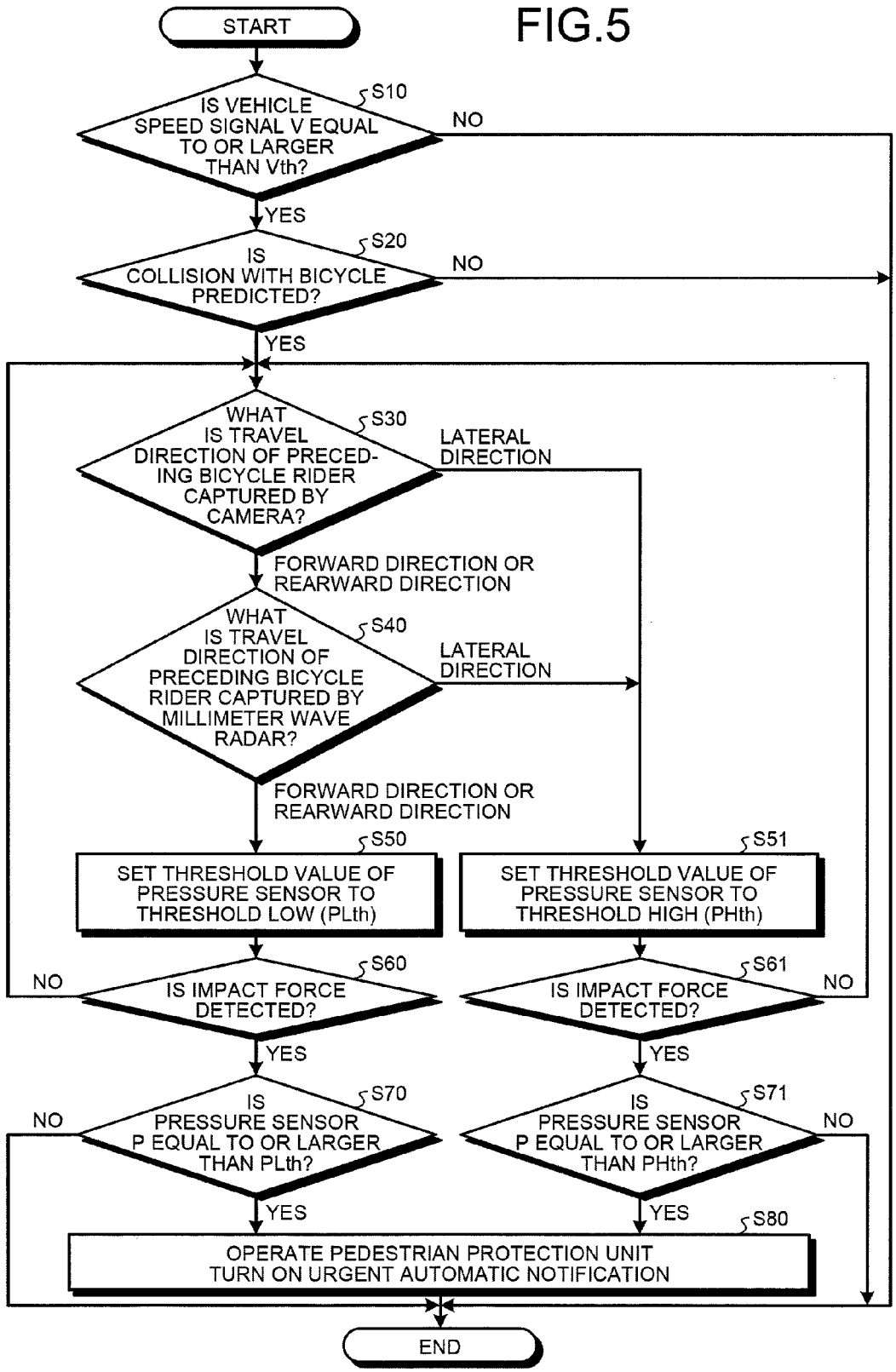

COLLISION DETECTION APPARATUS

CROSS-REFERENCE TO RELATED APPLICATIONS

The present application claims priority to and incorporates by reference the entire contents of Japanese Patent Application No. 2014-022842 filed in Japan on Feb. 7, 2014.

BACKGROUND OF THE INVENTION

1. Field of the Invention

The invention relates to a collision detection apparatus.

2. Description of the Related Art

Conventionally, a technique for protecting a pedestrian, a bicycle, a bike and the like has been reported that lowers a threshold value for determining whether or not it is necessary to operate a pedestrian air bag against an impact force as a result of determining that a risk of collision is high when an obstacle detected in a periphery of a vehicle is a pedestrian or the like (e.g. Japanese Laid-open Patent Publication No. 2003-291758).

Incidentally, in the impact forces detected at the time of collision with a bicycle being operated by a bicycle rider, the impact force at the time of collision with a side surface of a pedestrian or a bicycle being operated by a bicycle rider becomes larger than the impact force at the time of collision with a front surface or a rear surface of the bicycle. For example, as illustrated in FIG. 1, this is because that although a pressure sensor used as a collision detection sensor measures the effective mass of a collision object, at the time of the collision with the front or rear surface of the bicycle being operated by the bicycle rider, the bicycle rider is separated from the bicycle just after the collision with a front bumper of a vehicle and, therefore, the pressure sensor can measure only the effective mass of the bicycle alone. Consequently, the output value from the collision detection sensor becomes low.

Thus, when a threshold value at the time of prediction of collision with the pedestrian or the bicycle being operated by the bicycle rider is set to a value corresponding to the collision with the pedestrian or the collision with the side surface of the bicycle, the threshold value becomes higher than the impact force assumed at the time of collision with the front surface or the rear surface of the bicycle. Therefore, in that case, it may be possible that the collision with the front surface or the rear surface of the bicycle being operated by the bicycle rider cannot be detected. Further, when a threshold value that corresponds to the collision with the front surface or the rear surface of the bicycle is previously set, the threshold value becomes excessively lower in comparison with the impact force generated by the collision with the pedestrian or the side surface of the bicycle. Thus, in that case, a possibility of erroneously detecting an obstacle, which is not a target to be detected, as an object to be detected, which is set for the purpose of protecting a person outside of the vehicle, such as a pedestrian and a bicycle rider.

There is a need for a collision detection apparatus capable of increasing the possibility of detecting collision t with a front surface or a rear surface of a bicycle being operated by a bicycle rider while decreasing the possibility of erroneously detecting an obstacle that is not an object to be detected as the object to be detected when the collision with an obstacle outside of a vehicle has been detected.

SUMMARY OF THE INVENTIONS

It is an object of the present invention to at least partially solve the problems in the conventional technology.

A collision detection apparatus according to one aspect of the present invention includes: an impact force detector configured to detect an impact force generated on a vehicle; a collision detector configured to detect collision with an obstacle outside of the vehicle at the time the impact force detector detects the impact force exceeding a threshold value; a collision predictor configured to predict that a bicycle being operated by a bicycle rider will collide with the vehicle before the collision with the obstacle outside of the vehicle is detected by the collision detector; and a colliding direction predictor configured to predict that the collision of the bicycle with the vehicle predicted collision with a front surface or a rear surface of the bicycle, wherein the collision detector is configured to detect the collision with the obstacle at the time the colliding direction predictor does not predict the collision with the front surface or the rear surface of the bicycle, and the impact force detector detects the impact force exceeding a first threshold value, and the collision detector is configured to detect the collision with the obstacle including the collision with the front surface or the rear surface of the bicycle at the time the colliding direction predictor predicts the collision with the front surface or the rear surface of the bicycle, and the impact force detector detects the impact force exceeding a second threshold value set to a value lower than the first threshold value.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 5 is a flowchart illustrating an example of basic processing of the collision detection apparatus according to the embodiment of the present invention.

DETAILED DESCRIPTION OF THE PREFERRED EMBODIMENTS

An embodiment of a collision detection apparatus according to the present invention will be described below in detail with reference to the drawings. Note that the invention is not restricted by the embodiment. Further, components according to the embodiment include the components that can be easily assumed by a person skilled in the art or substantially the same components.

Figure 2:
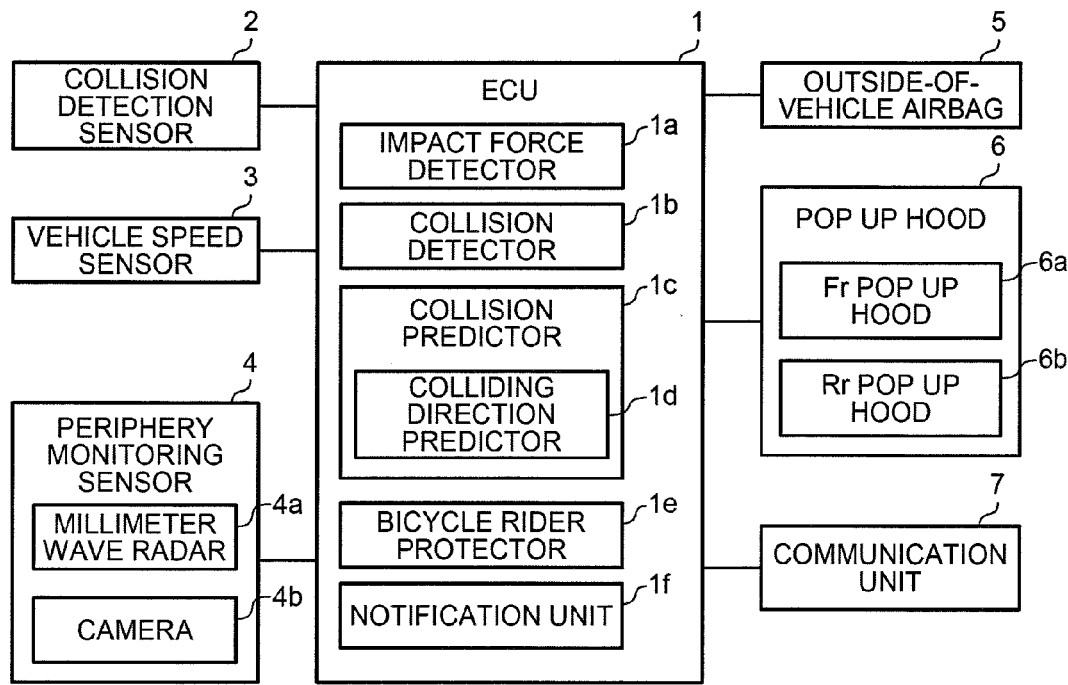
FIG. 2 is a view illustrating a configuration of a collision detection apparatus according to an embodiment of the present invention.
Figure 3:
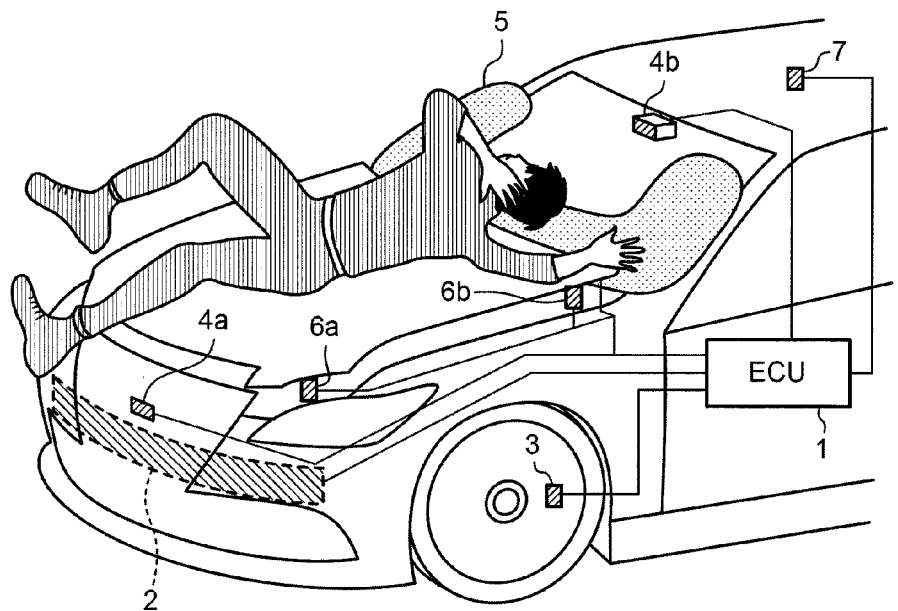
FIG. 3 is a view illustrating an example of a situation in which an outside-of-vehicle airbag has been deployed at the time of detection of collision with a person outside of a vehicle.
Figure 4:
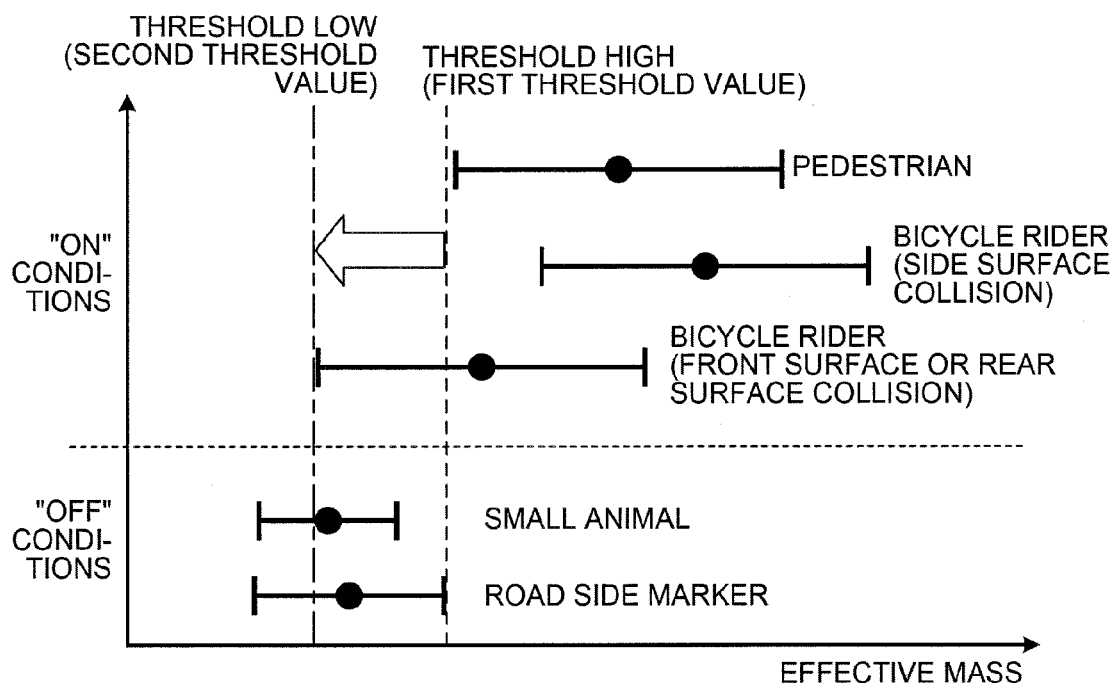
FIG. 4 is a view illustrating an example of a threshold value for determining whether or not it is necessary to operate the outside-of-vehicle airbag.

A configuration of a collision detection apparatus according to the embodiment of the present invention will be described referring to FIGS. 2 to 4. Here, FIG. 2 is a view illustrating the configuration of the collision detection apparatus according to the embodiment of the invention. FIG. 3 is a view illustrating an example of a situation in which an outside-of-vehicle airbag has been deployed at the time of detection of collision with a person outside of a vehicle. FIG. 4 is a view illustrating an example of a threshold value for determining whether or not it is necessary to operate the outside-of-vehicle airbag.

The collision detection apparatus according to the embodiment is mounted on a vehicle (driver's own vehicle) and typically includes, as illustrated in FIG. 2, an ECU 1, a collision detection sensor 2, vehicle speed sensors 3, a periphery monitoring sensor 4, an outside-of-vehicle airbag 5, a pop up hood 6, and a communication unit 7.

In FIG. 2, the ECU 1 controls the drive of respective units of the vehicle and is an electronic control unit that includes, as a main component, a microcomputer including a CPU, a ROM, a RAM, and an interface. The ECU 1 is electrically connected with the collision detection sensor 2, the vehicle speed sensors 3, and the periphery monitoring sensor 4, and input with an electric signal corresponding to a result of detection. The ECU 1 carries out various kinds of arithmetic processing according to the electric signal corresponding to the result of detection, and outputs a control command corresponding to a result of the arithmetic processing, thereby controlling the operation of various mechanisms (the outside-of-vehicle airbag 5, the pop up hood 6, and the communication unit 7, and the like) electrically connected to the ECU 1. Note that, various processing units (an impact force detector 1a, a collision detector 1b, a collision predictor 1c, a colliding direction predictor 1d, a bicycle rider protector 1e, and a notification unit 1f, and the like) included in the ECU 1 will be described later in detail.

The collision detection sensor 2 according to the embodiment is a bodily collision detection sensor for detecting collision with a person outside of a vehicle, such as a pedestrian or a bicycle ride. The collision detection sensor 2 is, for example, a pressure sensor or an optical fiber sensor. Further, the collision detection sensor 2 may be an acceleration sensor. The collision detection sensor 2 is mounted on a chamber ASSY including, for example, a chamber (or a tube) and a bumper absorber installed on an Fr bumper. The collision detection sensor 2 outputs an electric signal indicating the magnitude of detected collision to the ECU 1. According to the embodiment, the collision detection sensor 2 is a sensor for detecting the collision that triggers, for example, deployment of the outside-of-vehicle airbag 5 for protecting the person outside of the vehicle and operating the pop up hood 6. The collision detection sensor 2 has a detectable range of such a degree that it is possible to detect collision with an object having a mass corresponding to a pedestrian, a bicycle rider, or the like who may run onto a hood of the driver's own vehicle at the time of collision and collide with a pillar portion and a cowl portion in the periphery of a front window. The operation level of the collision detection sensor 2 according to the embodiment is set to a target of minor collision on the vehicle side in which a slight damage remains in a bumper.

The vehicle speed sensors 3 are a wheel speed detectors disposed to each of the wheels to detect the speed of each wheel. The respective vehicle speed sensors 3 detect the wheel speeds that are the rotation speeds of the respective wheels. The respective vehicle speed sensors 3 output the electric signals indicating the detected wheel speeds of the respective wheels to the ECU 1. The ECU 1 calculates the vehicle speed that is the travel speed of the vehicle based on the wheel speeds input from the respective vehicle speed sensors 3. The ECU 1 may calculate the vehicle speed based on the wheel speed input from at least one of the respective vehicle speed sensors 3.

The periphery monitoring sensor 4 is a periphery monitor unit for carrying out target detection, and the like by detecting an object in the periphery of the vehicle. The periphery monitoring sensor 4 detects three-dimensional objects, for example, a pedestrian, a bicycle rider, a bicycle, other vehicle, an electric pole, an obstacle, a guard rail, and a wall surface in the periphery of the vehicle as targets to be detected. The periphery monitoring sensor 4 includes, for example, a millimeter wave radar 4a and a camera 4b Further, the periphery monitoring sensor 4 can detects not only an object in the periphery of the vehicle but also detect the relative physical quantity showing the relative relation between the detected object and the vehicle. As the relative physical quantity, for example, the periphery monitoring sensor 4 detects at least one of the relative position (the coordinate system), the relative speed (m/s), the relative distance (m), and a TTC (Time-To-Collision) (s) between the vehicle and the object. The TTC corresponds to the time left until the vehicle reaches the object and corresponds to the time obtained by converting the relative distance between the vehicle and the object according to the relative speed. The periphery monitoring sensor 4 is electrically connected to the ECU 1 and outputs the target information (including the relative physical quantity, and the like) based on the detected target to the ECU 1.

The outside-of-vehicle airbag 5 is an airbag for protecting the person outside of the vehicle and deployed in front of the front window of the driver's own vehicle to protect the person outside of the vehicle at the time of collision with the pedestrian, the bicycle rider, or the like. According to the embodiment, when the pop up hood 6 is operated, the outside-of-vehicle airbag 5 is deployed in association with the operation thereof. The pop up hood 6 is a mechanism for easing impact by instantly lifting the hood of the driver's own vehicle to protect the person outside of the vehicle at the time of collision with the pedestrian, the bicycle rider, or the like. The pop up hood 6 is configured of, for example, a Fr pop up hood 6a for lifting a hood front end and a Rr pop up hood 6b for lifting a hood rear end.

As illustrated in, for example, FIG. 3, when the collision detection sensor 2 mounted on the Fr bumper detects the collision with the person outside of the vehicle such as the pedestrian or the bicycle rider, the Fr pop up hood 6a and the Rr pop up hood 6b are operated by a PUH lifter (a gunpowder type) according to a control command input by the ECU 1, and the outside-of-vehicle airbag 5 is deployed through a space of the hood rear end. The outside-of-vehicle airbag 5 is deployed when the magnitude of collision detected by the collision detection sensor 2 satisfies the deployment conditions of the outside-of-vehicle airbag 5. Further, in FIG. 3, for example, the millimeter wave radar 4a that configures the periphery monitoring sensor 4 is installed at a position in the vicinity of the Fr bumper on the front side of the vehicle so as to be able to measure the situation in the travel direction of the vehicle. Further, the camera 4b that configures the periphery monitoring sensor 4 is installed at a position in the vicinity of an upper portion of the front window in the vehicle so as to be able to pick up the situation of the travel direction of the vehicle. In addition to the above-mentioned, the collision detection sensor 2 is installed in the Fr bumper so as to be able to detect the collision generated in the travel direction of the vehicle. The vehicle speed sensor 3 is installed to each of the wheels. The communication unit 7 is installed at a position, such as an upper portion of the vehicle, so as to be able to secure a good normal state.

The communication unit 7 can make radio communication with facilities outside of the vehicle such as a fire station, a police station, a vehicle management center, and an insurance firm. The communication unit 7 is configured of, for example, a telematic transceiver (DCM), a mayday battery, a GPS, a data communication module ASSY, a telephone microphone ASSY, and a telephone antenna ASSY. According to the embodiment, the communication unit 7 makes radio communication with the facilities outside of the vehicle when the outside-of-vehicle airbag 5 is deployed and when the pop up hood 6 is operated. The information transmitted from the vehicle to the facilities outside of the vehicle by the radio communication via the communication unit 7 includes, for example, the information showing the position of the vehicle (for example, a latitude, a longitude, the name of a place, a road name, and a road shape), the information as to the vehicle for specifying the vehicle (for example, a maker name, the model name of the vehicle, the vehicle-mounted machine ID, the vehicle ID, and the frame number at the time of manufacture).

In the collision detector according to the embodiment, the deployment condition of the outside-of-vehicle airbag 5 is set to, for example, as illustrated in FIG. 4, such a condition that the outside-of-vehicle airbag 5 is deployed when the magnitude of collision detected by the collision detection sensor 2 becomes equal to or larger than a first threshold value (threshold HIGH in FIG. 4) as a default value. The first threshold value is set to such a value that, with magnitude of collision detected by the collision detection sensor 2, collision with an obstacle (for example, a small animal or a road side marker) is not to be detected but collision with a person outside of the vehicle (for example, the pedestrian or the bicycle rider) can be detected. In other words, the first threshold value is set to such a value that can discriminate the collision with an object which has a mass corresponding to that of the person outside of the vehicle and is a target to be detected, and the collision with an object which has a mass corresponding to that of an obstacle other than the person outside of the vehicle and is not the target to be detected.

Figure 1:
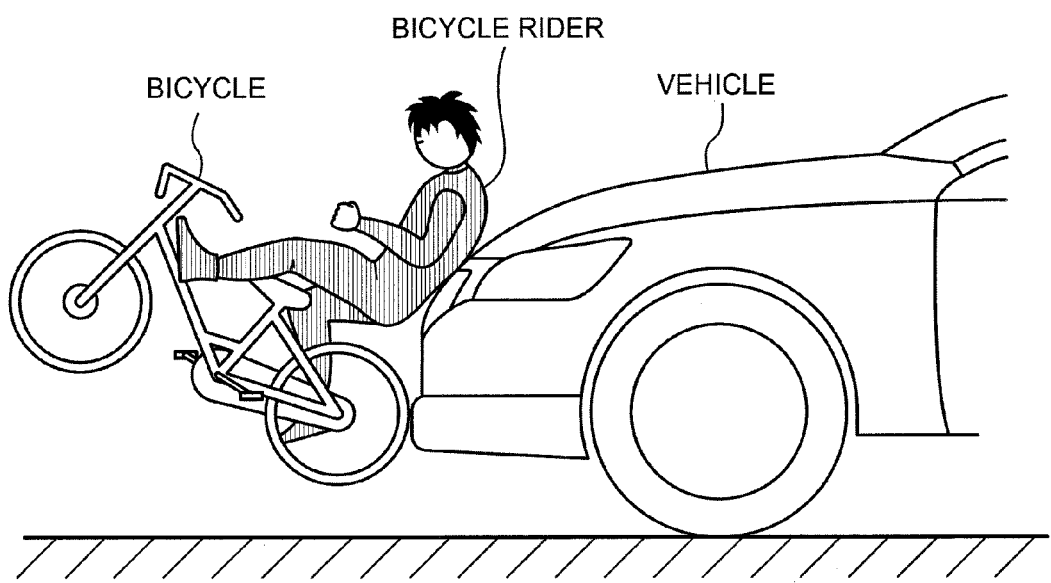
FIG. 1 is a view illustrating an example of a situation where a vehicle has collided with a rear surface of a bicycle being operated by a bicycle rider.

Incidentally, as illustrated in FIG. 4, at the time of collision with the pedestrian and at the time of lateral collision with the bicycle being operated by the bicycle rider, the outside-of-vehicle airbag 5 can be securely deployed only by the condition that the outside-of-vehicle airbag 5 is deployed when the magnitude of collision detected by the collision detection sensor 2 becomes equal to or larger than the first threshold value (threshold HIGH). However, at the time of collision with a front surface or rear surface of the bicycle being operated by the bicycle rider, the outside-of-vehicle airbag 5 may not be deployed. As illustrated in, for example, FIG. 1 described above, this is because, at the time of the collision with the front surface or the rear surface of the bicycle being operated by the bicycle rider, the bicycle rider is separated from the bicycle just after the collision with the Fr bumper of the vehicle. Therefore, only the effective mass of the bicycle alone can be measured and thus the output value of the collision detection sensor 2 becomes low. To securely deploy the outside-of-vehicle airbag 5 also at the time of the collision with the front surface or rear surface of the bicycle being operated by the bicycle rider, as illustrated in FIG. 4, it is necessary to set a condition that the outside-of-vehicle airbag 5 is deployed when the magnitude of collision detected by the collision detection sensor 2 becomes equal to or larger than a second threshold value (in FIG. 4, threshold Low). However, since the condition causes the outside-of-vehicle airbag 5 to deploy to a collision target, such as the load side marker and the small animal to which the outside-of-vehicle airbag 5 is not intended to deploy, the condition causes the outside-of-vehicle airbag 5 to be deployed too sensitively.

Thus, in the collision detection apparatus according to the embodiment, when the collision with the front surface or the rear surface of the bicycle being operated by the bicycle rider is predicted, the deployment condition of the outside-of-vehicle airbag 5 is controlled to change from the default value and is set to a condition that the outside-of-vehicle airbag 5 is deployed when the magnitude of collision detected by the collision detection sensor 2 becomes equal to or larger than the second threshold value (in FIG. 4, threshold Low). The control is carried out by various processing units of the ECU 1.

Returning to FIG. 2, the various processing units of the ECU 1 will be described in detail. The ECU 1 includes at least the impact force detector 1*a*, the collision detector 1*b*, the collision predictor 1*c*, the colliding direction predictor 1*d*, the bicycle rider protector 1*e*, and the notification unit 1*f*.

In the ECU 1, the impact force detector 1*a* is an impact force detection unit for detecting the impact force generated on the vehicle. According to the embodiment, the impact force detector 1*a* detects the impact force generated on the vehicle based on an electric signal indicating the magnitude of collision input from the collision detection sensor 2.

The collision detector 1*b* is a collision detection unit for detecting the collision with the obstacle outside of the vehicle when the impact force detected by the impact force detector 1*a* exceeds the threshold value. According to the embodiment, in a case where the collision with the front surface or the rear surface of the bicycle being operated by the bicycle rider is not predicted by the colliding direction predictor 1*d* to be described later, the collision detector 1*b* detects the collision with the obstacle when the impact force detected by the impact force detector 1*a* exceeds the first threshold value. In contrast, in a case where the collision with the front surface or the rear surface of the bicycle is predicted by the colliding direction predictor 1*d*, the collision detector 1*b* detects the collision with the obstacle including the collision with the front surface or the rear surface of the bicycle being operated by the bicycle rider when the impact force detected by the impact force detector 1*a* exceeds the second threshold value that is set to the value lower than the first threshold value.

The collision predictor 1*c* is a collision prediction unit for predicting that the bicycle being operated by the bicycle rider will collide with the vehicle before the collision with the obstacle outside of the vehicle is detected by the collision detector 1*b*. According to the embodiment, the collision predictor 1*c* predicts that the bicycle being operated by the bicycle rider will collide with the vehicle based on the target information (including the relative physical quantity, and the like) input from the periphery monitoring sensor 4. For example, the collision predictor 1*c* determines whether or not a bicycle is the bicycle being operated by the bicycle rider by analyzing the image picked up by the camera 4*b* that configures the periphery monitoring sensor 4 by a method of pattern matching, and the like. When the collision predictor 1*c* determines that the bicycle is the bicycle being operated by the bicycle rider, the collision predictor 1*c* predicts that the bicycle being operated by the bicycle rider will collide with the vehicle when it is determined based on the TTC between the vehicle measured by the millimeter wave radar 4*a* which configures the periphery monitoring sensor 4 and the bicycle being operated by the bicycle rider that the TTC is a numerical value indicating that the collision cannot be avoided.

The collision predictor 1*c* further includes the colliding direction predictor 1*d*. The colliding direction predictor 1*d* is a colliding direction prediction unit for predicting that the collision of the bicycle with the vehicle predicted by the collision predictor 1*c* is the collision with the front surface or the rear surface of the bicycle. According to the embodiment, the colliding direction predictor 1*d* predicts that the collision of the bicycle being operated by the bicycle rider with the vehicle will be the collision with the front surface or the rear surface of the bicycle based on the target information (including the relative physical quantity, and the like) input from the periphery monitoring sensor 4. For example, when the colliding direction predictor 1*d* determines that the bicycle moves in the lateral direction to the travel direction of the vehicle based on the time series change of the relative position, the relative speed, and the relative distance, and the like between the vehicle and the bicycle being operated by the bicycle rider measured by the millimeter wave radar 4*a* that configures the periphery monitoring sensor 4, the colliding direction predictor 1*d* predicts that the collision with the side surface of the bicycle will occur. In contrast, when the colliding direction predictor 1*d* determines that the bicycle moves in a longitudinal direction to (in parallel to) the travel direction of the vehicle, the colliding direction predictor 1*d* predicts that the collision with the front surface or the rear surface of the bicycle will occur.

In addition to the above-mentioned, the colliding direction predictor 1*d* may determine that the collision with the front surface or the rear surface of the bicycle occurs or the collision with the side surface of the bicycle occurs by analyzing the positions of a light and reflectors installed to the vehicle and the behaviors thereof based on the image picked up by the camera 4*b* that configures the periphery monitoring sensor 4. In the case, when the colliding direction predictor 1*d* detects the reflected light of a reflector that is in an approximately still state and the reflected lights of two reflectors that alternately move up and down, respectively, since the colliding direction predictor 1*d* can estimate from the relative positional relation therebetween that the travel direction of the bicycle is the longitudinal direction to the travel direction of the vehicle and is the same direction as the travel direction of the vehicle in the case, the colliding direction predictor 1*d* determines that the collision with the rear surface of the bicycle occurs. Further, when the colliding direction predictor 1*d* detects the reflected lights of the two reflectors that alternately move up and down, respectively, and a headlight, the colliding direction predictor 1*d* can estimate that the travel direction of the bicycle will be the longitudinal direction to the travel direction of the vehicle from the relative positional relation therebetween and will be an opposite direction to the travel direction of the vehicle in the case As a result, the colliding direction predictor 1*d* determines that the collision with the front surface of the bicycle occurs. Further, when the reflected lights of the two reflectors draw approximately circular orbits, respectively, the colliding direction predictor 1*d* can estimate that the travel direction of the bicycle will be the lateral direction to the travel direction of the vehicle from the relative positional relation therebetween. As a result, the colliding direction predictor 1*d* determines that the collision with the side surface of the bicycle occurs.

The bicycle rider protector 1*e* is a bicycle rider protection unit for starting an operation of protecting the bicycle rider when the collision with the obstacle including the collision with the front surface or the rear surface of the bicycle being operated by the bicycle rider is detected by the collision detector 1*b*. According to the embodiment, when the collision with the person outside of the vehicle is detected, the bicycle rider protector 1*e* deploys the outside-of-vehicle airbag 5 and operates the pop up hood 6 as the operation of protecting the bicycle rider.

The notification unit 1*f* is a notification unit for carrying out an automatic notification to the facilities outside of the vehicle when the collision with the obstacle including the collision with the front surface or the rear surface of the bicycle being operated by the bicycle rider is detected by the collision detector 1*b*. According to the embodiment, when the collision with the person outside of the vehicle is detected, the notification unit 1*f* transmits the information showing the position of the vehicle, the information as to the vehicle for specifying the vehicle, and the like to the facilities outside of the vehicle such as the fire station, the police station, the vehicle management center, and the insurance firm, via the communication unit 7 as the automatic notification.

Subsequently, the processing carried out by the collision detection apparatus configured as described above will be described referring to FIG. 5. FIG. 5 is a flowchart illustrating an example of basic processing of the collision detection apparatus according to the invention. Note that, the processing illustrated in FIG. 5 will be repeatedly carried out at every short calculation cycle (for example, 50 or 100 msec).

As illustrated in FIG. 5, the ECU 1 determines whether or not a vehicle speed signal V input from the vehicle speed sensor 3 is equal to or larger than a predetermined threshold value Vth (step S10). The predetermined threshold value Vth is set to a value that can determine that the vehicle is at rest or does not travel slowly (for example, 0 to 10 km/h). At step S10, when the ECU 1 determines that the vehicle speed signal V is not equal to or larger than the predetermined threshold value Vth, that is, smaller than the predetermined threshold value Vth (step S10: No), the ECU 1 finishes the processing. In contrast, when the ECU 1 determines that the vehicle speed signal V is equal to or larger than the predetermined threshold value Vth (step S10: Yes), the ECU 1 proceeds to the processing at next step S20.

The ECU 1 determines whether or not the collision with the bicycle rider is predicted (step S20). Specifically, at step S20, the collision predictor 1*c* of the ECU 1 predicts that the bicycle being operated by the bicycle rider will collide with the vehicle based on the target information (including the relative physical quantity, and the like) input from the periphery monitoring sensor 4. For example, the collision predictor 1*c* determines whether or not the bicycle is the bicycle being operated by the bicycle rider by analyzing the image picked up by the camera 4*b* that configures the periphery monitoring sensor 4 by the method of the pattern matching, and the like. When the collision predictor 1*c* determines that the bicycle is the one being operated by the bicycle rider, and that the TTC is the numerical value that cannot avoid the collision based on the TTC between the vehicle measured by the millimeter wave radar 4*a*, which configures the periphery monitoring sensor 4, and the bicycle being operated by the bicycle rider, the collision predictor 1*c* predicts that the bicycle being operated by the bicycle rider will collide with the vehicle. When the ECU 1 predicts the collision with the bicycle rider at step S20 by the processing of the collision predictor 1c (step S20: Yes), the ECU 1 proceeds to the processing at next step S30. In contrast, when the ECU 1 does not predict the collision with the bicycle rider by the processing of the collision predictor 1c (step S20: No), the ECU 1 finishes the processing.

The ECU 1 determines whether the travel direction of the bicycle rider in front of the camera 4b is the forward direction or the rearward direction (namely, the longitudinal direction) or the lateral direction to the vehicle, based on the image picked up by the camera 4b of the periphery monitoring sensor 4 (step S30). The travel direction of the bicycle rider described herein includes also the direction in front of the bicycle in a state that although the bicycle rider rides on the bicycle, the bicycle itself is at rest in addition to the direction in which the vehicle moves in a state that the bicycle rider operates the bicycle. At step S30, the colliding direction predictor 1d of the ECU 1 predicts and determines whether the predicted collision of the bicycle with the vehicle is the collision with the front surface or the rear surface of the bicycle or the collision with the side surface of the bicycle based on the image picked up by the camera 4b of the periphery monitoring sensor 4. For example, at step S30, the colliding direction predictor 1d predicts and determines whether the collision occurs to the front surface or the rear surface of the bicycle or occurs to the side surface of the bicycle by analyzing the positions of the light and the reflectors installed to the bicycle and the behaviors thereof based on the image picked up by the camera 4b that configures the periphery monitoring sensor 4.

When the ECU 1 determines at step S30 that the travel direction of the bicycle rider in front of the camera 4b is the lateral direction (step S30: lateral direction), the ECU 1 proceeds to the processing at step S51. In contrast, when the ECU 1 determines that the travel direction of the bicycle rider in front of the camera 4b is the forward direction or the rearward direction (step S30: forward direction or rearward direction), the ECU 1 proceeds to the processing at next step S40.

The ECU 1 determines whether the travel direction of the bicycle rider in front of the millimeter wave radar 4a is the forward direction or the rearward direction (namely, the longitudinal direction) or the lateral direction based on the various information measured by the millimeter wave radar 4a of the periphery monitoring sensor 4 (step S40). At step S40, the colliding direction predictor 1d of the ECU 1 predicts and determines whether the predicted collision of the bicycle with the vehicle occurs to the front surface or the rear surface of the bicycle or occurs to the side surface of the bicycle based on the various information measured by the millimeter wave radar 4a of the periphery monitoring sensor 4. For example, when the colliding direction predictor 1d determines at step S40 that the bicycle moves in the lateral direction to the travel direction of the vehicle based on the time series change of the relative position, the relative speed, and the relative distance, and the like between the vehicle and the bicycle being operated by the bicycle rider measured by the millimeter wave radar 4a that configures the periphery monitoring sensor 4, the colliding direction predictor 1d predicts that the collision with the side surface of the bicycle will occur. In contrast, when the colliding direction predictor 1d determines that the bicycle moves in the longitudinal direction to the travel direction of the vehicle, the colliding direction predictor 1d predicts that the collision will occur to the front surface or the rear surface of the bicycle.

When the ECU 1 determines at step S40 that the travel direction of the bicycle rider in front of the millimeter wave radar 4a is the lateral direction (step S40: lateral direction), the ECU 1 proceeds to the processing at step S51. In contrast, when the ECU 1 determines that the travel direction of the bicycle rider in front of the millimeter wave radar 4a is the forward direction or the rearward direction (step S40: forward direction or rearward direction), the ECU 1 proceeds to the processing at next step S50.

When the ECU 1 determines at step S30 that the travel direction of the bicycle rider in front of the camera 4b is the forward direction or the rearward direction (step S30: forward direction or rearward direction) and determines at step S40 that the travel direction of the bicycle rider in front of the millimeter wave radar 4a is the forward direction or the rearward direction (step S40: forward direction or rearward direction), the ECU 1 sets a threshold LOW PLth (second threshold value) as a threshold value used to determine whether or not the magnitude of collision (pressure P) detected by the pressure sensor serving as the collision detection sensor 2 has such a degree of triggering deployment the outside-of-vehicle airbag 5 (step S50). As described above, when the collision with the front surface or the rear surface of the bicycle is predicted by the colliding direction predictor 1d at step S30 and step S40, the collision detector 1b of the ECU 1 sets at step S50 the threshold value used to determine whether or not it is necessary to operate the outside-of-vehicle airbag 5 to the threshold Low PLth (the second threshold value), which is lower than the value set before the prediction of the collision with the front surface or the rear surface of the bicycle (in FIG. 5, the threshold HIGH PHth (the first threshold value) of the default value). Thereafter, the ECU 1 proceeds to the processing at next step S60.

The ECU 1 determines whether or not the impact force generated on the vehicle has been detected (step S60). Specifically, at step S60, when the impact force detector 1a of the ECU 1 has obtained the electric signal indicating the magnitude of collision input from the pressure sensor serving as the collision detection sensor 2, the impact force detector 1a determines that it has detected the impact force generated on the vehicle. At step S60, when the ECU 1 determines that the impact force has been detected by the processing of the impact force detector 1a (step S60: Yes), the ECU 1 proceeds to the processing at next step S70. In contrast, when the ECU 1 determines that the impact force has not been detected by the processing of the impact force detector 1a (step S60: No), the ECU 1 returns to the processing at step S30.

The ECU 1 determines at step S60 whether or not the magnitude (P) of collision detected by the pressure sensor serving as the collision detection sensor 2 is equal to or larger than the threshold value (PLth) set at step S50 (P PLth) (step S70). When the ECU 1 determines at step S70 that the magnitude (P) of collision detected by the pressure sensor is smaller than the threshold value (PLth) (P<PLth) (step S70: No), the ECU 1 finishes the processing. In contrast, when the ECU 1 determines that the magnitude (P) of collision detected by the pressure sensor is equal to or larger than the threshold value (PLth) (P≥PLth) (step S70: Yes), the ECU 1 proceeds to the processing at step S80.

As described above, at step S50, when the collision detector 1b of the ECU 1 changes the threshold value used to determine whether or not it is necessary to operate the outside-of-vehicle airbag 5 so that the threshold value becomes lower than the value set before the collision with the front surface or the rear surface of the bicycle was predicted (in FIG. 5, the threshold HIGH PHth (the first threshold value) of the default value) and when the impact force detected by the impact force detector 1a exceeds at step S70 the threshold value having been changed (in FIG. 5, the threshold Low PLth), the collision detector 1b detects the collision with the obstacle including the collision with the front surface or the rear surface of the bicycle. With the operation, when the collision with an obstacle outside of the vehicle is detected, the possibility of detecting the collision occurring to the front surface or the rear surface of the bicycle can be increased while reducing to erroneously detecting an obstacle that is not an object to be detected as an object to be detected.

Returning to step S51, the description of the processing will be continued. When the ECU 1 determines at step S30 that the travel direction of the bicycle rider in front of the camera 4b is the lateral direction (step S30: the lateral direction) or determines at step S40 that the travel direction of the bicycle rider in front of the millimeter wave radar 4a is the lateral direction (step S40: the lateral direction), the ECU 1 decides to use the threshold HIGH PHth (the first threshold value) as the threshold value used to determine whether or not the magnitude (pressure (P)) of collision detected by the pressure sensor serving as the collision detection sensor 2 has such a degree that triggers deployment the outside-of-vehicle airbag 5 without changing the default value (step S51). Thereafter, the ECU 1 proceeds to the processing at next step S61.

The ECU 1 determines whether or not the impact force generated on the vehicle has been detected (step S61). Specifically, at step S61, when the impact force detector 1a of the ECU 1 has obtained the electric signal indicating the magnitude of collision input from the pressure sensor serving as the collision detection sensor 2, the impact force detector 1a determines that it has detected the impact force generated on the vehicle. When the ECU 1 determines at step S61 that the impact force has been detected by the processing of the impact force detector 1a (step S61: Yes), the ECU 1 proceeds to the processing at next step S71. In contrast, when the ECU 1 determines that the impact force has not been detected by the processing of the impact force detector 1a (step S61: No), the ECU 1 returns to the processing at step S30.

The ECU 1 determines at step S61 whether or not the magnitude (P) of collision detected by the pressure sensor serving as the collision detection sensor 2 is equal to or larger than the threshold value (PHth) that has been decided to be used without changing the default value at step S51 (P≥PHth) (step S71). When the ECU 1 determines at step S71 that the magnitude (P) of collision detected by the pressure sensor is smaller than the threshold value (PHth) (P<PHth) (step S71: No), the ECU 1 finishes the processing. In contrast, when the ECU 1 determines that the magnitude (P) of collision detected by the pressure sensor is equal to or larger than the threshold value (PHth) (P≥PHth) (step S71: Yes), the ECU 1 proceeds to the processing at next step S80.

When the ECU 1 determines at step S70 that the magnitude (P) of collision detected by the pressure sensor is equal to or larger than the threshold value (PLth) (P PLth) (step S70: Yes) or determines that the magnitude (P) of collision detected by the pressure sensor is equal to or larger than the threshold value (PHth) (P≥PHth) (step S71: Yes), the ECU 1 operates the pedestrian protection unit to protect the person outside of the vehicle and carries out the urgent automatic notification (step S80). Thereafter, the ECU 1 finishes the processing.

When the pedestrian protection unit is operated at step S80, the bicycle rider protector 1e of the ECU 1 deploys the outside-of-vehicle airbag 5 and operates the pop up hood 6 as an operation of protecting the bicycle rider. Further, when the urgent automatic notification is carried out at step S80, the notification unit 1f of the ECU 1 transmits the information showing the position of the vehicle and the information as to the vehicle for specifying the vehicle to the facilities outside of the vehicle, such as an emergency dispatch center, a fire office, a police station, a vehicle management center, and an insurance firm, via the communication unit 7. In this way, at step S80, when the driver's own vehicle collides with the person outside of the vehicle such as the pedestrian or the bicycle rider, damage to the person outside of the vehicle can be reduced by operating the pedestrian protection unit and carrying out the urgent automatic notification. Specifically, according to the embodiment, when the pedestrian or the bicycle rider collides with the driver's own vehicle, the pedestrian protection unit and the urgent automatic notification function are operated instantly by the pressure sensor installed to the LOW side (sensitive side) just after the pedestrian or the bicycle rider comes into contact with the Fr bumper. Therefore, the present invention can contribute to reduce the damage of the pedestrian or the bicycle rider. At the same time, when it is detected that a preceding bicycle rider travels in the lateral direction, the threshold of the pressure sensor is set to the HIGH side (insensitive side). Accordingly, even if the collision with an object such as a road side marker or a small animal which does not require the protection unit is detected, without colliding with the bicycle rider, it is also possible to prevent the pedestrian protection unit and the urgent automatic notification function from being operated. Note that, although the case that the collision detection sensor 2 is configured of the pressure sensor has been described as an example, with reference to FIG. 5, the same processing can be carried out even if the collision detection sensor 2 is configured of an optical fiber sensor or an acceleration sensor other than the pressure sensor.

When the collision with the front surface or the rear surface of a bicycle being operated by a vehicle rider is predicted, the collision detection apparatus according to the embodiment of the present invention changes the threshold value set to detect the collision with an obstacle outside of a vehicle so that the value becomes lower than the value that had been set before the collision with the front surface or the rear surface of the bicycle was predicted. With the configuration, in the collision detection apparatus according to the embodiment of the invention, when the collision with an obstacle outside of the vehicle is detected, an effect of increasing the possibility of detecting the collision with the front surface or the rear surface of the bicycle can be achieved while lowering the possibility of erroneously detecting an obstacle that is not an object to be detected as an object to be detected.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A collision detection apparatus comprising:
   an impact force detector configured to detect an impact force generated on a vehicle;
   a collision detector configured to detect collision with an obstacle outside of the vehicle at the time the impact force detector detects the impact force exceeding a threshold value;
   a collision predictor configured to predict that a bicycle being operated by a bicycle rider will collide with the vehicle before the collision with the obstacle outside of the vehicle is detected by the collision detector; and a colliding direction predictor configured to predict whether the vehicle collides with a front surface or a rear surface of the bicycle in a case where the collision predictor predicts the collision of the vehicle with the bicycle, wherein the collision detector is configured to detect the collision with the obstacle, when the colliding direction predictor does not predict the collision with the front surface or the rear surface of the bicycle and the impact force detector detects the impact force exceeding a first threshold value, and the collision detector is configured to detect the collision with the obstacle including the collision with the front surface or the rear surface of the bicycle, when the colliding direction predictor predicts the collision with the front surface or the rear surface of the bicycle and the impact force detector detects the impact force exceeding a second threshold value set to a value lower than the first threshold value.

2. The collision detection apparatus according to claim 1 further comprising a bicycle rider protection unit configured to start an operation of protecting the bicycle rider when the collision detector detects the collision with the obstacle including the collision with the front surface or the rear surface of the bicycle.

3. The collision detection apparatus according to claim 1, further comprising a notification unit configured to carry out an automatic notification to a facility outside of the vehicle when the collision detector detects the collision with the obstacle including the collision with the front surface or the rear surface of the bicycle.

4. The collision detection apparatus according to claim 2, further comprising a notification unit configured to carry out an automatic notification to a facility outside of the vehicle when the collision detector detects the collision with the obstacle including the collision with the front surface or the rear surface of the bicycle.

* * * * *